US007258938B2

(12) United States Patent
Yamamoto et al.

(10) Patent No.: US 7,258,938 B2
(45) Date of Patent: Aug. 21, 2007

(54) POLYMER ELECTROLYTE FUEL CELL

(75) Inventors: Noriyuki Yamamoto, Kashiba (JP); Nobuo Katoh, Kameoka (JP); Hideaki Yukawa, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 444 days.

(21) Appl. No.: 10/087,994

(22) Filed: Mar. 5, 2002

(65) Prior Publication Data

US 2002/0127440 A1 Sep. 12, 2002

(30) Foreign Application Priority Data

Mar. 6, 2001 (JP) ............................ 2001-062403

(51) Int. Cl.
*H01M 8/06* (2006.01)
*H01M 8/16* (2006.01)

(52) U.S. Cl. .............................. 429/19; 429/2; 429/43

(58) Field of Classification Search .................... 429/2, 429/17, 19, 43
See application file for complete search history.

(56) References Cited

U.S. PATENT DOCUMENTS 4,532,210 A 7/1985 Miura et al.
4,567,117 A * 1/1986 Patel et al. .................... 429/19
5,834,264 A 11/1998 Sanford et al.
5,858,569 A * 1/1999 Meacher et al. .............. 429/26
6,395,521 B1 5/2002 Miura
6,531,239 B2 * 3/2003 Heller ......................... 429/43
6,686,075 B2 * 2/2004 Gieshoff et al. ............... 429/2
2002/0127440 A1 9/2002 Yamamoto et al.

FOREIGN PATENT DOCUMENTS

JP 58-60992 A 4/1983
JP 61-205492 A 9/1986
JP 2-31134 A 2/1990
JP 4-169178 A 6/1992
JP 7-218469 8/1995
JP 8-294396 A 11/1996
JP 10-64572 A 3/1998
JP 11-16588 A 1/1999
JP 2000-331702 11/2000
JP 2002-270209 A 9/2002
JP 2002-270210 A 9/2002

OTHER PUBLICATIONS

Palmore, G. et al., "A methanol/dioxygen biofuel cell that uses NAD+-dependent dehydrogenases as catalysts," Journal of Electroanalytical Chemistry vol. 443 pp. 155-161 (Feb. 10, 1998).*

(Continued)

*Primary Examiner*—Jonathan Crepeau
(74) *Attorney, Agent, or Firm*—Nixon & Vanderhye, P.C.

(57) ABSTRACT

A polymer electrolyte fuel cell includes a housing provided with an anode-side supply inlet for supplying a material for fuel, an anode and a cathode accommodated in the housing to sandwich a polymer electrolyte membrane, and a layer containing a biochemical catalyst which decomposes the material for fuel to generate fuel, the layer being formed between the anode-side supply inlet and the anode.

11 Claims, 1 Drawing Sheet

OTHER PUBLICATIONS

Suzuki et al., "Energy production with immobilized cells," Applied Biochemistry and Bioengineering (1983), 4, 281-310 (abstract only), no month.*

Suzuki et al., "Application of a biochemical fuel cell to wastewaters," Biotechnology and Bioengineering Symposium (1979), 8, (Biotechnol. Energy Prod. Conserv.) 501-11 (abstract only), no month.*

Karube et al., "Biochemical fuel cell utilizing immobilized cells of Clostridium butyricum," Biotechnology and Bioengineering (1977), 19 (11), 1727-33 (abstract only), no month.*

Kayukawa, Junji; The Nikkan Kogyo Shinbun, Ltd., Trigger, Jul. 2000, p. 14.

Nikkei Bio-tech, Nikkei Business Publications, Inc., Mikkei Latest Biotechnological Term Dictionary, 4th Edition, p. 346, 1995.

Larsson et al., "Kinetics of *Escherichia coli* hydrogen production during short term repeated aerobic-anaerobic fluctuation", Bioprocess Engineering, vol. 9, No. 4, 1993, pp. 167-172.

Tanisho et al., "Fermentative hydrogen evolution by Enterobacter aerogenes strain E. 82005", International Journal of Hydrogen Energy, vol. 12, issue 9, 1987, pp. 623-627.

Tanisho et al., "Microbial fuel cell using Enterobacter aerogenes", Journal of Electroanalytical Chemistry, vol. 275, 1989, pp. 25-32.

Nandi et al., "Involvement of anaerobic reductases in the spontaneous lysis of formate by immobilized cells of *Escherichia coli*", Enzyme and Microbial Technology, vol. 19, 1996, pp. 14-16.

* cited by examiner

POLYMER ELECTROLYTE FUEL CELL

CROSS-REFERENCE TO RELATED APPLICATION

This application is related to Japanese Patent Application No.2001-62403 filed on Mar. 6, 2001, whose priority is claimed under 35 USC § 119, the disclosure of which is incorporated by reference in its entirety.

BACKGROUND OF THE INVENTION

1. Field of the Invention

The present invention relates to a polymer electrolyte fuel cell. More particularly, in the polymer electrolyte fuel cell, an oxygen-containing hydrocarbon is introduced as a material for fuel from a supply section for supplying the material for fuel. The material for fuel is decomposed by a biochemical catalyst to generate hydrogen as fuel before the material for fuel reaches an anode of the polymer electrolyte fuel cell, and the generated hydrogen is supplied to the anode.

2. Description of Related Art

A fuel cell is provided with a cathode and an anode on both sides of an electrolyte. The cathode (oxidizer electrode) is supplied with an oxidizing gas such as oxygen, air or the like and the anode (fuel electrode) is supplied with a fuel such as hydrogen, a hydrocarbon or the like, so that an electrochemical reaction is induced to generate electricity and water.

Fuel cells are classified into a number of groups such as alkaline fuel cells, acid fuel cells, molten carbonate fuel cells, solid oxide fuel cells, and polymer electrolyte fuel cells (PEFCs) according to their types of electrolytes. Of these fuel cells, the PEFCs have proton-conductive solid polymers as electrolytes and are systems using high-purity hydrogen gas as fuel.

Since the PEFCs can work effectively at low temperatures and have high output density, the PEFCs are very likely to be put in practical use for power generation for vehicles and for small-scale houses. However, the PEFCs have the disadvantage of requiring huge cylinders containing compressed hydrogen for supplying gaseous hydrogen as fuel. Or alternatively, hydrogen may be liquefied and stored in cylinders. However, the liquefaction of hydrogen needs cooling at an extremely low temperature of −253° C. Furthermore, because liquefied hydrogen evaporates easily and leaks from gaps between metal molecules of the cylinders, hydrogen is consumed significantly. In an alternative way, hydrogen may be stored in a special metal referred to as a "hydrogen-occulusion alloy. " However, in order to store a sufficient amount of hydrogen, a large amount of the alloy is required, and consequently, fuel supply systems become heavy (by Junji Kayukawa, *Trigger*, July 2000, page 14, THE NIKKAN KOGYO SHINBUN, LTD.). For the above-mentioned reasons, the PEFCs have some problems with their fuel supply systems, and at present it is difficult to put the PEFCs into widespread use as transportable power sources.

There are reforming processes of using liquid fuels containing hydrogen and decomposing the liquid fuels to generate hydrogen. The reforming processes include a steam reforming process of applying steam of extremely high temperature for inducing reaction and a partial oxidizing process of feeding oxygen for inducing reaction. Methanol can be reformed at a relatively low temperature of 300° C. as compared with gasoline, gas oil, propane, butane and methane. Since the temperature is still high, the size of reforming devices is difficult to reduce.

On the other hand, direct methanol-air fuel cells (DMFCs) are directly supplied with methanol as fuel. Since they can use proton-conductive polymers as electrolytes, the DMFCs can possibly work at temperatures lower than 100° C. Since the fuel is liquid and is easy to transport and store, the DMFCs are considered to be suitable for size reduction and transportabilization. Thus the DMFCs are regarded as very likely power sources for automobiles and power sources for mobile electronic equipment.

Direct methanol-air fuel cells using proton-conductive polymer membranes as electrolytes (PEM-DMFCs) have a structure in which porous electrodes carrying electrocatalysts are formed on both faces of a membrane of a fluorinated polymer having sulfonic acid groups, for example, a thin membrane such as Nafion® manufactured by DuPont, in such a manner as the porous electrodes sandwich the polymer membrane, the anode is directly supplied with an aqueous methanol solution and the cathode is supplied with oxygen or air. At the anode, methanol reacts with water to generate carbon dioxide, protons and electrons:

$$CH_3OH+H_2O \rightarrow CO_2+6H^++6e^-.$$

At the cathode, oxygen reacts with protons and electrons to generate water:

$$3/2O_2+6H^++6e^- \rightarrow 3H_2O.$$

These reactions progress with the help of the electrocatalysts carried by the electrodes. The theoretical voltage of these reactions is 1.18 V, however in practical cells, the actual voltage is lower than the theoretical voltage for various reasons.

Platinum catalyzes the reaction of methanol with water and is an excellent anode catalyst. General mechanism of the reaction of platinum with methanol is represented by the following chemical formulae:

$$Pt+CH_3OH \rightarrow Pt\text{-}CH_2OH+H^++e^-$$

$$Pt\text{-}CH_2OH \rightarrow Pt\text{-}CHOH+H^++e^-$$

$$Pt\text{-}CHOH \rightarrow Pt\text{-}CHO+H^++e^-$$

$$Pt\text{-}COH \rightarrow Pt\text{-}CO+H^++e^-$$

$$Pt\text{-}CO+H_2O \rightarrow Pt+CO_2+2H^++2e^-$$

However, the surface of the platinum electrocatalyst is poisoned with CO generated from methanol during the reactions. Consequently, the reaction area of the platinum electrocatalyst decreases, and therefore, the performance of cells declines.

In order to prevent the platinum electrocatalyst from being poisoned with CO, measures are taken to improve a surface structure of the platinum electrocatalyst or to add different metals such as Ru, Sn, W and the like to platinum. However, the different metals have lower catalytic activities to methanol than platinum, and to compensate that, the reaction temperature needs to be elevated. If the reaction temperature is high, methanol penetrates through the proton-conductive polymer electrolyte membrane (Nafion® membrane, Dow® membrane, Aciplex® membrane, Flemion® membrane) from an anode side of the membrane to reach the cathode, and directly reacts with an oxidizer on the electrocatalyst of the cathode. This phenomenon is referred to as cross-over, which is a short-circuit problem. Also, the elevation of the reaction temperature is not suitable for power sources for mobile electronic equipment which needs to be operated at relatively low temperatures.

Bacteria such as Clostridia and Bacilli are known to decompose oxygen-containing hydrocarbons and produce water and carbon dioxide through sugar fermentation (Nikkei Latest Biotechnological Terms Dictionary, 4th edition, edited by Nikkei Bio-tech, Nikkei Business Publications, Inc., page 346). In order to measure the amount of hydrogen produced by such bacteria, an example is reported in which the produced hydrogen is supplied to the anode of a fuel cell and the amount of generated electricity is measured. However, this is not put into practical use as a polymer electrolyte fuel cell (Japanese Unexamined Patent Publication No. HEI 7(1995)-218469).

Accordingly, there is a demand for a polymer electrolyte fuel cell which uses an oxygen-containing hydrocarbon such as methanol as a material for fuel and can generate electricity at low temperatures with good efficiency.

BRIEF SUMMARY

An object of the present invention is to provide a polymer electrolyte fuel cell wherein a supplied oxygen-containing hydrocarbon is passed through a layer containing a biochemical catalyst comprised of a hydrogen-generative anaerobic bacterium, a hydrogen-generative yeast, a hydrogen-generative enzyme and/or the like and thereby the oxygen-containing hydrocarbon is decomposed to produce hydrogen, which is supplied as fuel to the anode of the polymer electrolyte fuel cell.

The present invention provides a polymer electrolyte fuel cell comprising a housing provided with an anode-side supply inlet for supplying a material for fuel; an anode and a cathode accommodated in the housing to sandwich a polymer electrolyte membrane; and a layer containing a biochemical catalyst which decomposes the material for fuel to generate fuel, the layer being formed between the anode-side supply inlet and the anode.

Further the present invention provides a polymer electrolyte fuel cell comprising: a housing provided with an anode-side supply inlet for supplying a material for fuel, the anode-side supply inlet being connected to a supply section for supplying the material for fuel; an anode and a cathode accommodated in the housing to sandwich a polymer electrolyte membrane; and a filter containing a layer containing a biochemical catalyst which decomposes the material for fuel to generate fuel, the filter being formed in the supply section.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
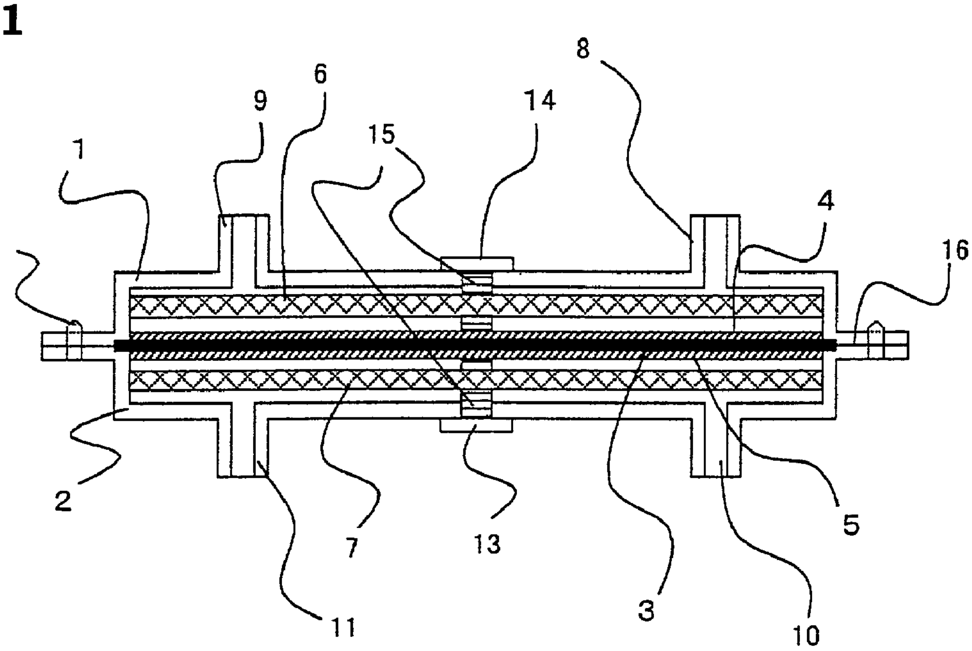
FIG. 1 is a schematic sectional view of a polymer electrolyte fuel cell whose anode-side collector is also used as a biochemical catalyst layer in accordance with the present invention.

The housing for accommodating the polymer electrolyte fuel cell usable in the present invention may be one formed of an electrically insulative resin such as acrylic resin, polypropylene resin, polyethylene terephthalate resin, polycarbonate resin, polyether • ether ketone resin, polyamide resin or the like. Among these, one formed of acrylic resin is preferred.

In the present invention, the supply inlet for supplying the material for fuel is provided on an anode side of the housing. The supply section for supplying the material for fuel includes all members used for supplying the material for fuel to the polymer electrolyte fuel cell. For example, the supply section includes a pipe for connecting the supply inlet to a generator which generates the material for fuel, and valves and pipes between the generator and the supply inlet. The supply section may be formed integrally with the housing or may be detachably attached to the supply inlet of the housing. In the case where the supply section is formed integrally with the housing, the supply section is a part of the polymer electrolyte fuel cell, and the polymer electrolyte fuel cell as a whole becomes smaller in size and simpler in shape. On the other hand, in the case where the supply section is detachably attached to the supply inlet of the housing, the supply section is attached to the housing via the supply inlet when the polymer electrolyte fuel cell is used, and the supply section can be detached when the supply section is not required. Therefore, it is also possible to reduce the size of the polymer electrolyte fuel cell. An inlet for supply an oxidizer may also be provided on a cathode side of the housing.

The polymer electrolyte membrane may be formed of a resin having, as cation exchange groups, sulfonic acid groups, phosphonic acid groups, phenolic hydroxyl groups or fluorinated carbon and sulfonic acid groups, PSSA-PVA (polystyrene sulfonic acid polyvinyl alcohol copolymer), PSSA-EVOH (polystyrene sulfonic acid ethylenevinyl alcohol copolymer) and the like. Among these resins, is preferred an ion exchange resin having fluorinated carbon and sulfonic acid groups, and more particularly, Nafion® (tradename, ex-DuPont) is used. The polymer electrolyte membrane is obtained by forming a precursor of a resin into a membrane by a known process such as heat press molding, roll molding, extrusion or the like and hydrolyzing and treating the formed membrane to be in acid form. The polymer electrolyte membrane may also be obtained by solvent casting from a solution of a fluorinated cation exchange resin in a solvent such as alcohol or the like.

The anode and the cathode used in the present invention may be formed by making water repellant a porous substrate of carbon, carbon paper, formed carbon, sintered carbon, sintered metal, foamed metal, metal fiber aggregate or the like. These electrodes may be used together with electrocatalysts of precious metals. Besides platinum, gold, palladium and ruthenium may be used singly or as an alloy for the electrocatalysts of precious metals, for both the cathode and anode. An alloy of platinum and ruthenium is preferred for the electrocatalyst of the anode. The amount of the electrocatalyst may be 0.01 $mg/cm^2$ to 10 $mg/cm^2$, preferably 0.1 $mg/cm^2$ to 0.5 $mg/cm^2$ with respect to the electrode.

The electrocatalyst can be attached to the electrodes by the following process. For example, a mixture of fine particles of platinum and ruthenium, as it is or carried on a carbon having a large surface area, is mixed with an alcohol solution containing the polymer electrolyte and polytetrafluoroethylene which serves as a binder and as a water repellant. The resulting mixture is sprayed onto the porous electrode, for example, of carbon paper and coupled to the polymer electrolyte by hot press (U.S. Pat. No. 5,599,638. Alternatively, a mixture of fine particles of platinum and ruthenium or its oxide, as it is or carried on a carbon having a large surface area, is mixed with an alcohol solution containing the polymer electrolyte, and this electrocatalyst mixture solution was applied onto a plate of polytetrafluoroethylene. After being dried, the electrocatalyst mixture is peeled off the polytetrafluoroethylene plate, transferred onto the porous electrode of carbon paper or the like, and coupled to the polymer electrolyte by hot press (X. Ren et al., *J.Electrochem.Soc.,* 143. L12(1996)).

In the present invention, the biochemical catalyst for generating fuel by decomposing the material for fuel is one or more species selected from the group consisting of hydrogen-generative anaerobic bacteria such as *Clostridia* (e.g., *clostridium butyricum, clostridium acetobutylicum*), *Lactobacilli* (e.g., *Lactobacillus pentoaceifus*), and photosynthetic bacteria including *Rhodospirilli* (e.g., *Rhodospirillum rubrum*) and *Rhodopseudomonas* (e.g., *Rhodopseudomonas spheroides*); hydrogen-generative yeasts such as methylotrophic yeast; and hydrogen-generative enzymes such as methanol-assimilating enzyme, methanol dehydrase and formate-hydrogen lyase. Among these biochemical catalysts, a combination of clostridium butyricum and formate-hydrogen lyase is preferred.

In the present invention, the layer containing the biochemical catalyst may be located within the fuel cell, i.e., between the anode and the supply inlet on the anode side for supplying the material for fuel, or may be located in the supply section for supplying the material for fuel. More particularly, in the case where the layer exists between the anode and the supply inlet within the fuel cell, the layer may be in the form of a filter in the supply inlet, or may also serve as an anode-side collector of the fuel cell. In the case where the layer exists within the supply section, the layer may be in the form of a filter or a cartridge comprising the layer in the supply section which is formed integrally with or separately from the housing of the polymer electrolyte fuel cell.

A collector used in the present invention may be formed by making water repellant a porous substrate of carbon paper, formed carbon, sintered carbon, carbon fiber, carbon fiber paper, sintered metal, foamed metal, metal fiber aggregate or the like. Among these materials, carbon fiber paper is preferred. The filter as the layer containing the biochemical catalyst may be formed of a material similar to that of the collector such as carbon fiber.

The layer containing the biochemical catalyst is produced by fixing the biochemical catalyst onto a layer of a porous material such carbon black, acetyl cellulose, collagen • polyvinyl alcohol, zeolite, precipitated silica or the like. As techniques for fixing the biochemical catalyst, may be mentioned the technique of covalent-bonding the biochemical catalyst to a fixation carrier, the technique of binding the biochemical catalyst by adsorption, an envelope fixation technique of enveloping the biochemical catalyst with a polymeric substance, and other techniques. The fixing techniques may be selected depending upon their compatibility with the biochemical catalyst. For example, a culture liquid of the biochemical catalyst may be put into and adsorbed by the fixation carrier located in a desired place for forming the layer. The culture liquid of the biochemical catalyst is prepared beforehand by cultivating the biochemical catalyst in a liquid medium such as ATOC38, liver-liver broth, thioglycolate medium or cooked meat (CM) medium of pH 2 to 8 at 10 to 40° C. for 0.5 to 20 days. If the biochemical catalyst is an anaerobic bacterium, the cultivation may preferably be carried out under oxygen-free conditions. More particularly, atmosphere is replaced by nitrogen. As examples of the fixation carrier, may be mentioned water-repellant porous substrates such as carbon paper, formed carbon, sintered carbon, carbon fiber, sintered metal, foamed metal, metal fiber aggregate and the like.

As examples of the material for fuel used in the present invention, may be mentioned water-soluble hydrocarbons decomposable by the biochemical catalyst, including for example alcohols (e.g., methanol, ethanol, isopropyl alcohol, glycol, etc.); polysaccharides (e.g., glucose, etc.); oxygen-containing hydrocarbons such as aldehydes, ketones, formic acid, acetic acid and the like which are intermediate products in the process in which the above-mentioned alcohols and polysaccharides are changed into hydrogen and carbon dioxide gas through oxidation. As the material for fuel, is selected one which is decomposed and finally generates hydrogen depending upon a selected combination of biochemical catalysts. For example, if the biochemical catalyst is a combination of a hydrogen-generative anaerobic bacterium belonging to the genus Clostridium and formate-hydrogen lyase, the material for fuel is preferably methanol.

In this case, methanol is oxidized to generate formaldehyde and then formic acid, which is formate-ionized. The generated formate ions produce hydrogen and carbon dioxide gas due to the action of formate-hydrogen lyase.

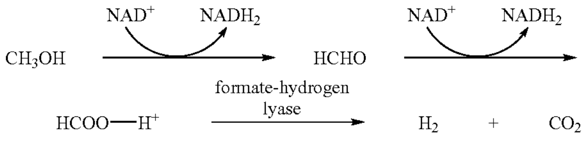

The produced hydrogen is then supplied to the anode of the polymer electrolyte fuel cell, where hydrogen is oxidized to produce protons and electrons. The resulting protons migrate through the electrolyte toward cathode. On the cathode, protons react with oxygen to produce water. The electrons travel from the anode to the cathode through an external circuit, producing an electric current. The produced carbon dioxide gas is discharged to the outside of the fuel cell system together with excess fuel.

Since water is a reaction medium for the biochemical catalyst decomposing the oxygen-containing hydrocarbon, the oxygen-containing hydrocarbon is preferably water-soluble. The oxygen-containing hydrocarbon may be supplied as it is or in the form of an aqueous solution, but is preferably supplied in the form of an aqueous solution.

EXAMPLES

The present invention is now described in detail with reference to examples, which are only for general illustration and should not be construed to limit the present invention.

Example 1

A polymer electrolyte fuel cell was produced as follows. Platinum was made carried by 5 g of carbon in an amount of 10 wt %. The resulting carbon was attached to a porous electrode (anode) 4 and a porous electrode (cathode) 5 (the amount of the electrocatalyst is 17 $mg/cm^2$ of the electrodes). The electrodes 4 and 5 were coupled by hot press to both faces of an electrolyte membrane 3 formed of Nation® manufactured by DuPont, to form a catalyst-integrated electrolyte membrane. On both sides of the resulting electrolyte membrane, an anode-side collector 6 and a cathode-side collector 7 were formed of carbon fiber. The polymer electrolyte fuel cell was accommodated in a housing (A)1 and a housing (B)2 which were formed of an acrylic resin which was an electrically insulative resin. The housing (A)1 was provided with a supply inlet 8 for a material for fuel and a fuel discharge outlet 9. The housing (B) was provided with an air supply inlet 10 and an air discharge outlet 11. Contact faces of the housings (A)1 and (B)2 were sealed with a silicone sheet 16 for preventing leakage of hydrogen, air or oxygen and were fastened with a bolt 12. For taking out electricity efficiently, an aluminum negative electrode 14 and an aluminum positive electrode 13 were connected to one end and another end of copper springs 15 which were located on the outer sides of the anode 4 and the cathode 5. As shown in FIG, 1, an anode side surface of the anode-side collector is also connected to sping 15 and therefore has conductivity. A mixture liquid, 3 mL, of formate-hydrogen lyase and Clostridium butyricum cultivated using a liquid medium ATOC 38 of a starting pH 8.0 at 30° C. for 10 days was put and fixed in the anode-side collector 6 (see FIG. 1).

Example 2

Figure 2:
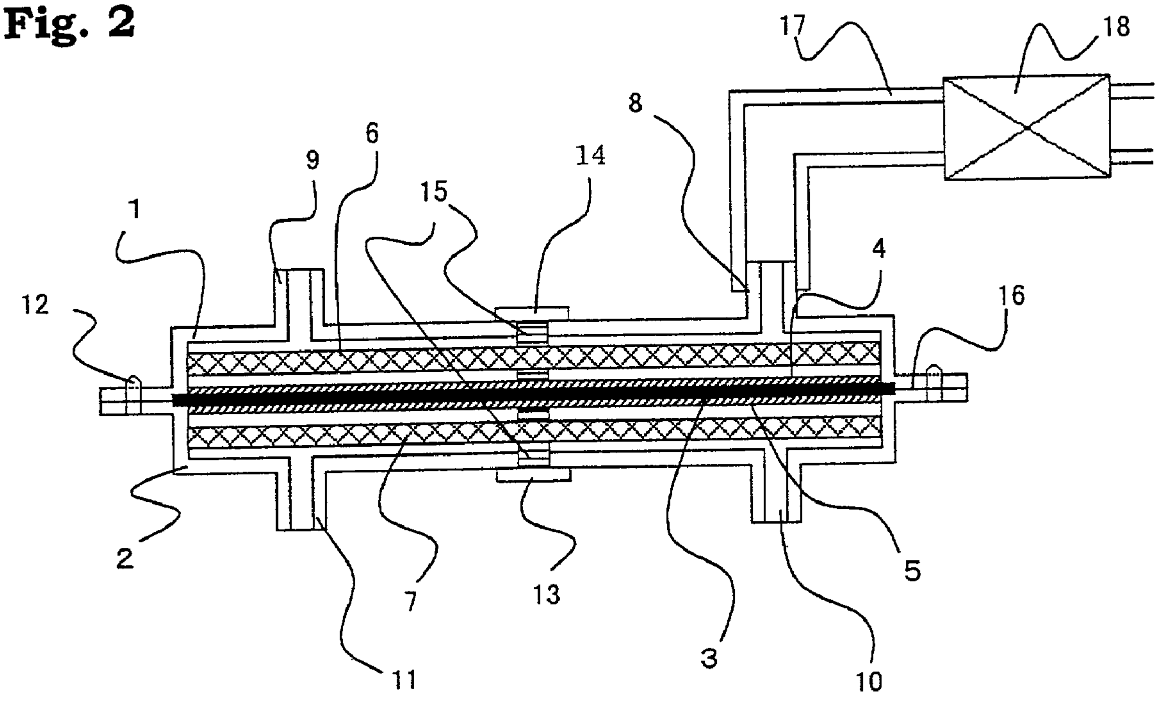
FIG. 2 is a schematic sectional view of a polymer electrolyte fuel cell provided with a filter containing a biochemical catalyst layer for decomposing a hydrocarbon within a fuel supply path before the fuel is supplied to the anode of the cell in accordance with the present invention.

A polymer electrolyte fuel cell is produced in the same manner as Example 1 except that the bacterium and the enzyme were not used for the anode-side collector 6. Further the polymer electrolyte fuel cell of Example 2 was provided with a filter 18 connected to the supply inlet 8 for the material for fuel by a connection pipe 17. The filter 18 was formed of the same material as the collectors 6 and 7. Clostridium butyricum and formate-hydrogen lyase were fixed in part of the filter by the aforesaid method. (see FIG. 2).

Reference Example 1

A polymer electrolyte fuel cell is produced in the same manner as Example 1 except that the bacterium and the enzyme were not used for the anode-side collector 6. Evaluation Test of polymer electrolyte fuel cells An aqueous solution of methanol was fed via the supply inlet 8 for the material for fuel of the polymer electrolyte fuel cell of Example 1. When the aqueous solution of methanol passed through the anode-side collector, hydrogen and carbon dioxide gas were generated due to the action of Clostridium butyricum and formate-hydrogen lyase. Carbon dioxide gas was discharged from the fuel discharge outlet 9 to the outside of the polymer electrolyte fuel cell together with excess hydrogen. On the other hand, the generated hydrogen was fed to the anode 4, and was ionized to generate protons due to the action of the platinum electrocatalyst provided in the anode. The generated protons passed through the electrolyte membrane 3 and reacted with oxygen ions to produce water on the cathode side. Electrons generated during this reaction are taken out of the fuel cell system, whereby electricity was generated constantly for 5 hours.

An aqueous solution methanol was fed via the supply inlet 8 for the material for fuel of the polymer electrolyte fuel cell of Reference Example 1. The resulting generation of electricity declined gradually, and stopped after three hours.

EFFECT OF THE INVENTION

As clearly seen from the examples and reference example, the polymer electrolyte fuel cell of the present invention generated electricity more efficiently than the ordinary methanol fuel cell which used an oxygen-containing hydrocarbon as fuel but did not use biochemical catalysts. According to the present invention, since carbon monoxide is not generated unlike the case where an oxygen-containing hydrocarbon is fed directly to the anode, the poisoning of platinum, ruthenium or the like used for the anode catalyst can be avoided. Further the fuel cell can work at low temperatures.

What is claimed is:

1. A polymer electrolyte fuel cell comprising:

a housing provided with an anode-side supply inlet for supplying a material for fuel;

an anode and a cathode accommodated in the housing to sandwich a polymer electrolyte membrane;

a layer containing a biochemical catalyst which decomposes the material for fuel to generate hydrogen, the layer being formed within the housing between the anode-side supply inlet and the anode;

wherein the biochemical catalyst comprises a combination of Clostridium butyricum and formate-hydrogen lyase.

2. A polymer electrolyte fuel cell comprising:

a housing provided with an anode-side supply inlet for supplying a material for fuel;

an anode and a cathode to sandwich a polymer electrolyte membrane; and a layer containing a biochemical catalyst which decomposes the material for fuel to generate fuel, the layer being formed between the anode-side supply inlet and the anode;

wherein the biochemical catalyst comprises a combination of Clostridium butyricum and formate-hydrogen lyase.

3. A fuel cell according to claim 2 further comprising an anode-side collector and a cathode-side collector which sandwich the anode and the cathode therebetween, wherein the anode-side collector also serves as the layer containing the biochemical catalyst.

4. A polymer electrolyte fuel cell comprising:

a housing provided with an anode-side supply inlet for supplying a material for fuel, the anode-side supply inlet being connected to a supply section for supplying the material for fuel;

an anode and a cathode accommodated in the housing to sandwich a polymer electrolyte membrane; and a filter containing a layer containing a biochemical catalyst which decomposes the material for fuel to generate fuel, the filter being formed in the supply section, wherein the biochemical catalyst comprises a combination of Clostridium butyricum and formate-hydrogen lyase.

5. A fuel cell according to claim 4 further comprising an anode-side collector and a cathode-side collector which sandwich the anode and the cathode therebetween, wherein the anode-side collector also serves as the layer containing the biochemical catalyst.

6. A polymer electrolyte fuel cell comprising:

a housing provided with an anode-side supply inlet for supplying a material for fuel;

an anode and a cathode accommodated in the housing to sandwich a polymer electrolyte membrane;

a layer containing a biochemical catalyst which decomposes the material for fuel comprising one or more material(s) selected from methanol, formaldehyde and formic acid, the layer being formed between the anode-side supply inlet and the anode;

wherein the biochemical catalyst comprises a combination of Clostridium butyricum and formate-hydrogen lyase.

7. A polymer electrolyte fuel cell comprising:

a housing provided with an anode-side supply inlet for supplying a material for fuel;

an anode and a cathode accommodated in the housing to sandwich a polymer electrolyte membrane; and a layer containing a biochemical catalyst which decomposes the material for fuel to generate fuel, the layer being formed between the anode-side supply inlet and the anode, wherein the biochemical catalyst comprises a combination of Clostridium butyricum and formate-hydrogen lyase, and the material for fuel is selected from oxygen-containing hydrocarbons such as alcohols, polysaccharides, aldehydes, ketones, and carboxylic acids.

8. A polymer electrolyte fuel cell comprising:

a housing provided with an anode-side supply inlet for supplying a material for fuel, the anode-side supply inlet being connected to a supply section for supplying the material for fuel;

man anode and a cathode accommodated in the housing to sandwich a polymer electrolyte membrane; and a filter containing a layer containing a biochemical catalyst which decomposes the material for fuel to generate fuel, the filter being formed in the supply section;

wherein the biochemical catalyst comprises a combination of Clostridium butyricum and formate-hydrogen lyase, and the material for fuel is selected from oxygen-containing hydrocarbons such as alcohols, polysaccharides, aldehydes, ketones, and carboxylic acids.

9. A polymer electrolyte fuel cell comprising:

a housing provided with an anode-side supply inlet for supplying a material for fuel;

an anode and a cathode accommodated in the housing to sandwich a polymer electrolyte membrane; and a layer containing a biochemical catalyst which decomposes the material for fuel to generate fuel, the layer being formed between the anode-side supply inlet and the anode;

wherein the biochemical catalyst comprises a combination of Clostridium butyricum and formate-hydrogen lyase, and the material for fuel is in the form of an aqueous solution.

10. A polymer electrolyte fuel cell comprising:

a housing provided with an anode-side supply inlet for supplying a material for fuel, the anode-side supply inlet being connected to a supply section for supplying the material for fuel;

an anode and a cathode accommodated in the housing to sandwich a polymer electrolyte membrane; and a filter containing a layer containing a biochemical catalyst which decomposes the material for fuel to generate fuel, the filter being formed in the supply section;

wherein the biochemical catalyst comprises a combination of Clostridium butyricum and formate-hydrogen lyase, and the material for fuel is in the form of an aqueous solution.

11. A polymer electrolyte fuel cell comprising:

a housing provided with an anode-side supply inlet for supplying a material for fuel, the anode-side supply inlet being connected to a supply section for supplying the material for fuel;

an anode and a cathode accommodated in the housing to sandwich a polymer electrolyte membrane;

a filter containing a layer containing a biochemical catalyst which decomposes the material for fuel comprising one or more material(s) selected from methanol, formaldehyde, and formic acid, the filter being formed in the supply section;

wherein the biochemical catalyst comprises a combination of Clostridium butyricum and formate-hydrogen lyase.

* * * * *